F. M. WELLER.
Whiffletree.
No. 41,334.   Patented Jan 19, 1864
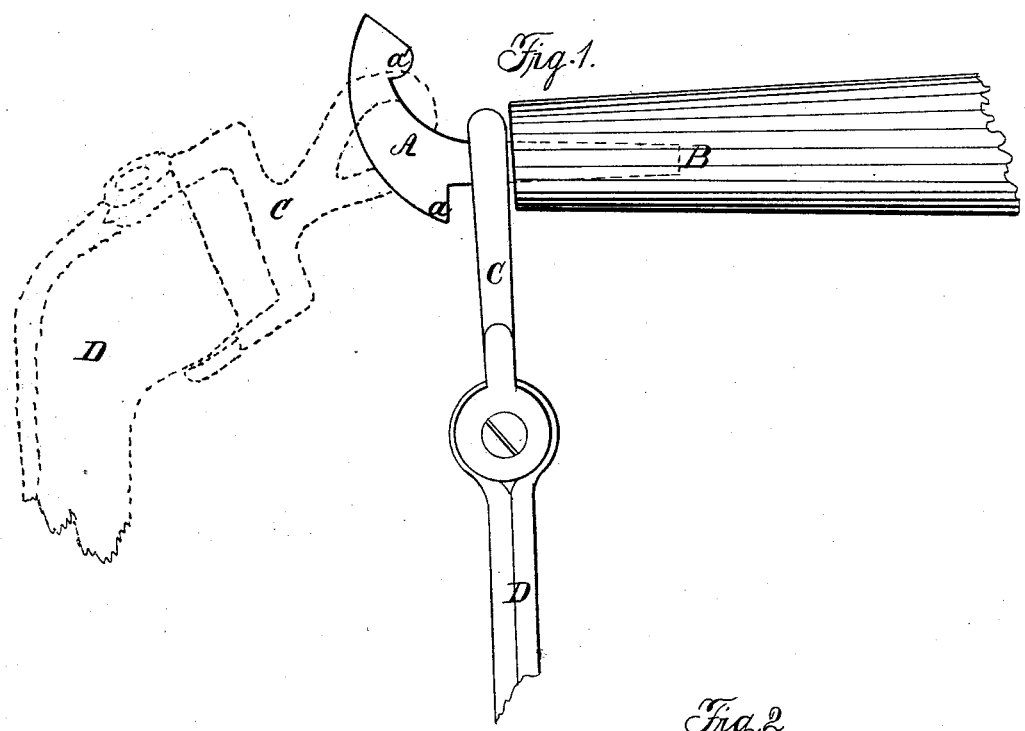
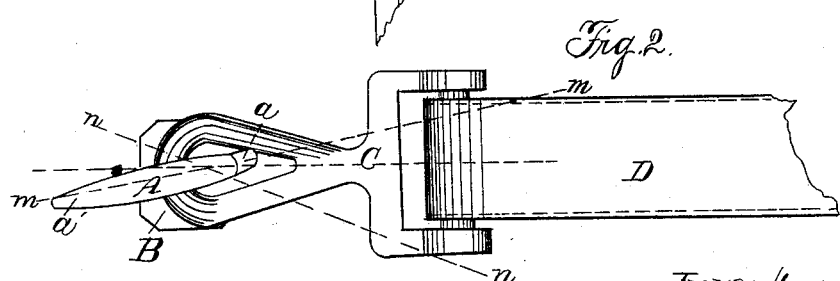
Witnesses
W. E. Mans
L. L. Coburn
Inventor:
F. M. Weller

UNITED STATES PATENT OFFICE.

F. M. WELLER, OF EVANSTON, ILLINOIS.

IMPROVEMENT IN TRACE-FASTENERS.

Specification forming part of Letters Patent No. 41,334, dated January 19, 1864.

*To all whom it may concern:*

Be it known that I, F. M. WELLER, of Evanston, in the county of Cook and State of Illinois, have invented a new and useful Improvement in Trace-Fasteners; and I do hereby declare that the following is a full, clear, and exact description thereof, reference being had to the accompanying drawings and the letters and figures marked thereon, which form part of this specification.

In said drawings, Figure 1 represents a plan or top view of my invention, and Fig. 2 an end view of the same.

The nature of my invention consists in a peculiar-constructed hook or attachment to the ends of a whiffletree, whereby the traces of a harness may be readily and securely fastened thereto, in a simple and much safer manner than has heretofore been accomplished.

To enable those skilled in the art to understand how to construct and use my invention, I will proceed to describe the same with particularity, reference being had to the drawings hereunto annexed.

A represents my improved trace-fastener, which is attached to the whiffletree B by means of a shaft or pin inserted in a socket in the end of the same; or it may be fixed thereto in any other secure and suitable manner.

The hook A is provided in front with the shoulder or projection $a$, and extending backward and downward, as shown in the drawings; is also provided with the posterior barb or projection, $a'$.

The dotted lines in Fig. 1 show the position of the trace D when being attached to the fastener, and has not only to be carried out laterally from the line of draft, but has also to be raised up until it lies in the same direction as the axis of the fastener, as shown by the line $m$ in Fig. 2, before the eye can be carried over and adjusted upon the hook A.

By observing the peculiar configuration and arrangement of the hook A it will be seen that in order to make it possible for the trace to be detached from this fastening, the trace must be raised up in the direction of the red line $m$, and also thrown out laterally, as shown by the dotted lines in Fig. 1—a coincidence which can hardly occur in practice, for when the trace is drawn taut it cannot take the position of the line $m$, and when it is slack it must necessarily take the position shown by the line $n$, so that although the slack trace might possibly be thrown out laterally, still it would be retained in place by the anterior projection, $a$.

In case, however, that by any possibility the slack trace should assume at once the position shown by the line $m$, and be also thrown out laterally over the anterior projection, still it could not then be detached from the fastening unless some positive force should be applied to throw the trace-eye both inward and backward, to force it back over the posterior projection, $a'$.

I consider the arrangement of this hook A with reference to the whiffletree B shown in Fig. 2 as an important one, and one possessing great additional advantage and security over the same hook when arranged parallel to the line of draft, but I do not make any claim to this arrangement.

Having now described my improved trace-fastener, I will proceed to specify what I claim as new therein and desire to secure by Letters Patent—

The hook A, provided with the stationary anterior and posterior projections, $a$ $a'$, constructed and arranged substantially as and for the purposes herein set forth and described.

F. M. WELLER.

Witnesses:
W. E. MARRS,
L. L. COBURN.